Patented May 12, 1953

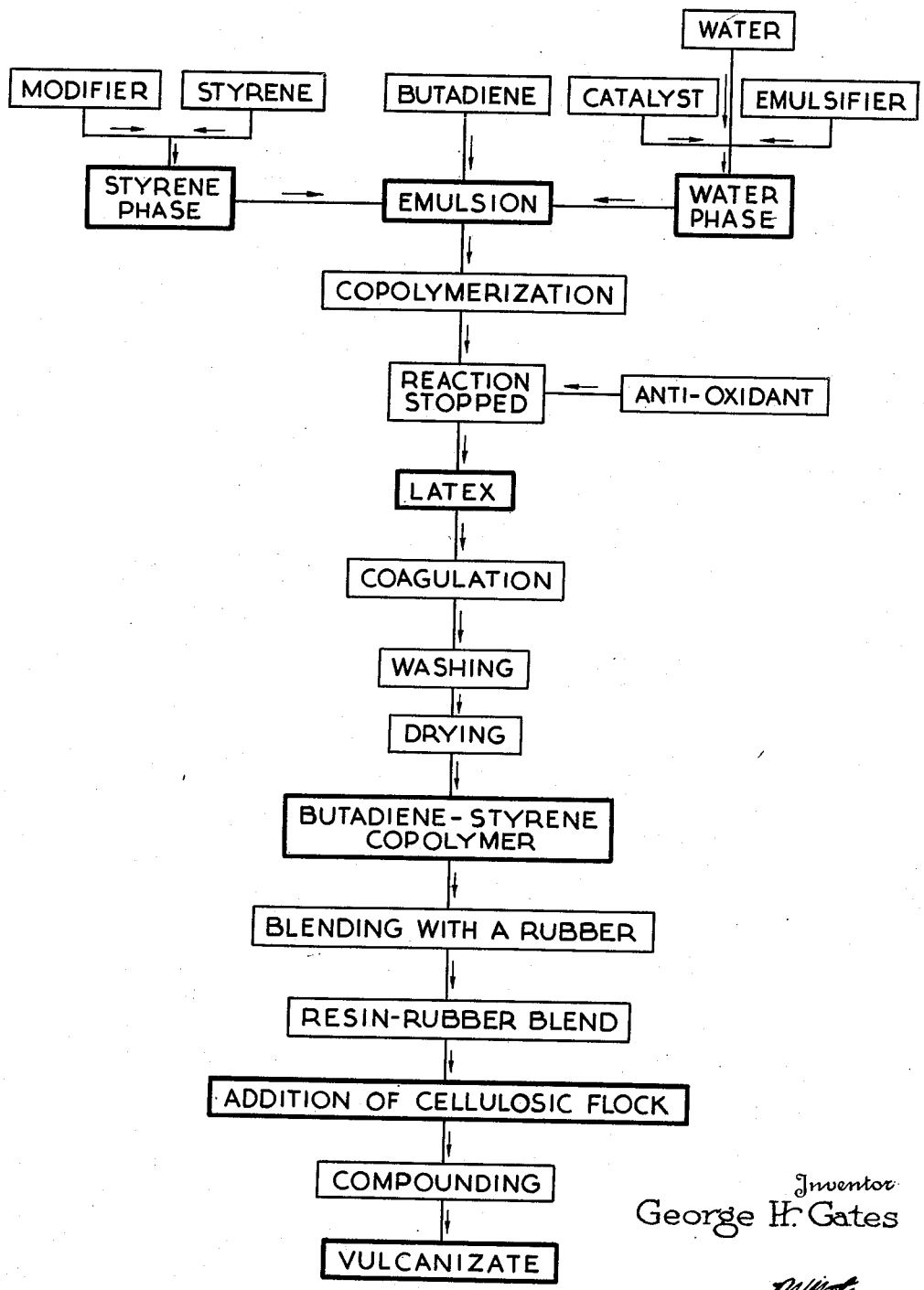

2,638,457

UNITED STATES PATENT OFFICE 2,638,457

SHOE SOLE COMPOSITION

George H. Gates, Cuyahoga Falls, Ohio, assignor to Wingfoot Corporation, Akron, Ohio, a corporation of Delaware Application October 2, 1945, Serial No. 619,876

7 Claims. (Cl. 260—17.4)

This invention relates to a new vulcanized shoe sole composition in sheet form comprising a substantial and effective amount of an inorganic filler and a cellulosic flock material and as a binder therefor the vulcanizate resulting from the vulcanization of a mixture of rubbery copolymer and resinous copolymer of butadiene-1,3 and styrene.

The drawing is a flow chart showing the process of producing the blend and the vulcanizate of this invention.

In the manufacture of shoe soles, leather has been considered a more useful material than natural rubber, although rubber possesses qualities rendering it desirable for use in footwear. A material which possesses the desirable characteristics of leather, together with the desirable characteristics of rubber, and without the undesirable characteristics of either, would constitute a great advance in the manufacture of shoe soles and in large measure increase foot comfort.

It is well-known that leather is subject to deterioration by moisture because of the constant wetting and drying action that leather soles undergo which soon cause them to become stiff, thereby interfering with proper foot comfort. Rubber, on the other hand, is not so affected, but presents other disadvantages as a shoe sole; for example in the matter of the transmission of heat from the walking surface to the foot. Rubber does not possess sufficient stiffness for foot comfort unless excessively loaded with pigments. In an attempt to impart the necessary stiffness to rubber for shoe sole use, various pigments have been used, including carbon black, whiting, etc., but the proper degree of stiffness is not obtained until such a large amount of stiffener or pigment has been incorporated that the pigmented rubber becomes "dead" in the sense that it has little or no resiliency or springiness. The pigmented rubber is also too heavy for practical shoe sole use. Where carbon black is used as the stiffener, the highly pigmented rubber badly marks the surface walked upon.

Ordinarily, rubber, natural or synthetic, is too flabby or soft for shoe sole use without loading and too difficult to cement to the shoe uppers. Furthermore, when stitched, the sole tends to roughen out in a hill and valley effect due to the tension put upon the material by the stitches. Also, the stitches tend to cut through the material. Ultimately, sore feet may be caused by the creep characteristics of such a soft and flabby material. Again, shoe soles made of rubber cannot be made harder than about 75-80 Shore hardness by the use of ordinary rubber pigments because the resulting pigmented rubber has a tendency to flex-crack under higher pigment loadings.

It has now been discovered that the synthetic rubber from butadiene-1,3 and styrene, heretofore ordinarily unsuitable as a shoe sole material, may be made more desirable than leather for shoe sole use when the rubber is blended with a resinous diene-vinyl copolymer and compounded with a cellulosic flock material. When this rubber is blended and compounded with these materials, an unexpected and highly desirable result is produced in that the resulting material has an exceptional "leathery feel," together with the proper resilience and springiness.

The rubber component of the new composition is a rubbery copolymer resulting from the polymerization of a mixture containing as the essential copolymerizable monomers butadiene-1,3 and styrene or a substituted styrene and having an elongation of at least 300% and the ability to retract to substantially its original shape.

The resinous component of the blend may vary from a hard, brittle resin to a stiff, flexible material depending upon the ratio of butadiene-1,3 and vinyl aromatic monomer present in the mixture polymerized. This resinous characteristic is present in the product resulting from the reaction of a mixture of butadiene-1,3 and vinyl aromatic monomer when present in a ratio between about 30/70 and about 5/95; i. e., about 30 to 5 parts of butadiene-1,3 to about 70 to 95 parts of vinyl compound (e. g., styrene).

The vinyl aromatic monomer of the resin may also be referred to as being an alpha, beta unsaturated aliphatic substituted aromatic monomer, specific examples being styrene, the substituted styrenes, e. g., metachlorostyrene, p-chlorostyrene, isomeric dichlorostyrenes, alkyl styrenes, e. g., methyl styrene, isopropyl styrene, and vinyl naphthalene, etc. A particularly desirable class of these monomers is constituted by the vinyl aryl monomers, the desired member being styrene.

The following description illustrates generally the preferred conditions to be employed in producing the resin component. Generally the drawing shows that the copolymerization is carried out in the emulsion stage in which a styrene phase, including a modifier and styrene, is reacted with butadiene-1,3 in the presence of a water phase, including a catalyst, an emulsifier and water. The copolymerization is continued at a temperature necessary to effect reaction of the styrene with butadiene until the desirable hydrocarbon conversion is reached. The resulting latex is then coagulated and the coagulum is washed and dried. Where it is desired to stop the reaction at a certain percent hydrocarbon conversion value, an antioxidant is introduced into the latex in sufficient amount to terminate the reaction and to protect the resulting coagulum against deterioration by oxidation.

A more specific example illustrates the copolymerization of a styrene phase, including 85 parts of styrene and 0.1 part of dodecyl mercaptan with 15 parts of butadiene in the presence of a water phase including 200 parts of water, 5 parts of sodium rosinate and 0.1 part of potassium persulfate at a temperature of 125° F. for a period of time to form a latex having a solids content of 32.5%, after which time 0.5% of phenyl beta-naphthylamine is introduced into the reaction. The latex is precipitated by the addition of a 3% commercial alum solution, the resulting coagulum being washed with water and dried to produce a resin having a softening point of 62° C.

Any suitable modifier may be added to the styrene phase. Suitable modifiers include those generally referred to as mercaptans containing at least six carbon atoms and particularly such mercaptans as isohexyl-, octadecyl-, and dodecyl mercaptan. Other desirable modifiers are the dialkyl polysulfides, the tertiary alkyl mercaptans, and the dialkyl xanthogen disulfides.

The modifier may be added in an amount between about 0.05% and about 3.0%, preferably in an amount between about 0.08% and about 2.0%, and it has been found particularly desirable to use about 0.1% in each case on the combined weight of the aryl and diene components used. The modifiers act to increase the solubility of the resulting resin in such solvents as benzene and toluene and also adjust the degree of stiffness of the resin. The greater the amount of modifier, the greater the solubility and the softer the resulting resin.

The water phase includes a catalyst, water and an emulsifier. Suitable catalysts that may be used are potassium persulfate, benzoyl peroxide, hydrogen peroxide, perborates, percarbonates. The catalyst may be used in an amount between about 0.1% and about 1%. Typical emulsifiers are those which may be generally referred to as the fatty acid soaps, e. g., sodium stearate and the rosin acid soaps, e. g., sodium rosinate, and the alkali metal salts of alkali sulfuric acid esters, e. g., sodium lauryl sulfate, and the alkali metal salts of alkyl aryl sulfonates, e. g., sodium dodecyl benzene sulfonate. The emulsifier may be present in amount between about 0.1% and about 5%.

Water is present in an amount based upon the total amount of monomers being reacted and may be used in a monomer/water ratio between about 100/60 to about 100/200. Generally, the copolymerization is carried out at a temperature between about 20° C. and about 70° C. for a period of time between about 4 hours and about 100 hours, depending upon the percent conversion desired, the charged monomer ratio, the catalyst used and the type of monomers present.

The butadiene-styrene rubber is blended with the resinous copolymer and compounded with a cellulosic flock material and with a substantial and effective amount of inorganic filling material and a vulcanizing agent and vulcanized to produce the shoe sole material of this invention.

A synthetic rubber which is admirably adapted for this blending and compounding is the one resulting from the copolymerization of butadiene-1,3 and styrene in which the butadiene is present in a predominant amount, and particularly where the butadiene-styrene ratio ranges from about 60/40 to about 85/15.

A desirable shoe sole material is produced when blending the resinous material with a rubber in a resin-to-rubber ratio from between about 5/95 to about 75/25.

A typical blending formula is one in which about 100 parts of the rubber is blended with between about 25 to about 100 parts of the resin and between about 10 and about 25 parts of a cellulosic flock material. This composition may then be further compounded with suitable accelerators, softeners, sulfur and fillers to produce a vulcanizable shoe material which may then be vulcanized and cured at a temperature between about 300° F. and about 340° F. for a period of time between about 10 minutes and about 1 hour to produce a shoe sole material having the desirable characteristics mentioned hereinbefore.

A representative compounding formula is as follows:

| | Parts by weight |
|---|---|
| Rubber | 100 |
| Diene-vinyl resinous material | 25–100 |
| Cellulosic flock material | 10–25 |
| Sulfur | 2–3 |
| Organic accelerator (Tuads, Captax, etc.) | 1–2 |
| Zinc oxide | 3–5 |
| Filler (clay, whiting, silene, etc.) | 60–100 |
| Stearic acid | 0.5–1 |
| Softener (paraffin, pine tar, asphalt derivatives, etc.) | 5–20 |

In the formula above, Tuads is tetramethylthiuramdisulfide, Captax is mercaptobenzothiazole and silene is a hydrated calcium silicate.

The usual blending operation is conducted in a Banbury mill in which the rubber is first added, and after a few minutes breakdown the resin is added in a small amount, together with the sulfur or other desirable rubber accelerator and the zinc oxide, until the batch is heated to a temperature of about 200° F. and about 225° F. The flock material, softener, filler and stearic acid may then be added and the milling continued until a thoroughly mixed mass has been obtained.

This material may then be extruded into a sheet of desirable thickness for shoe sole use and cured in the usual manner to give a vulcanized material which then may be used in uncut form for shoe soles or may be precut into standard shoe sole sizes.

It has been observed that the presence of the cellulosic flock material is essential in producing a shoe sole composition having the desirable properties mentioned. For example, the presence of this flock material improves the non-skid properties of the composition on icy and wet surfaces, and materially reduces the tendency for the composition to "grow" or "spread," by which quoted terms is meant that the dimensional stability of the sole composition has been improved. The flock also improves the "feel" of the composition, by which quoted term is meant that the composition has a feel of leathery smoothness which is desirable in a shoe sole material. The flock also prevents flex-cracking of the blend alone. The flock may be added in an amount between about 10 parts to about 25 parts per 100 parts of rubber used and it is preferred to use between about 15 parts and about 25 parts. Any cellulosic flock material may be used, including cotton and rayon flocks. However, it is preferred to use the rayon flock.

Suitable changes may be made in the details of the process without departing from the spirit or scope of the present invention, the proper limits of which are defined in the appended claims.

I claim:

1. A composition in sheet form comprising a filler including about 10 to about 25 parts of a cellulosic flock material together with a substantial and effective amount of mineral filler, and as a binder therefor the vulcanizate resulting from the vulcanization of (1) a rubbery copolymer of a major proportion of butadiene and a minor proportion of styrene, (2) 25 to 100 parts of a hard, thermoplastic resin obtained by copolymerizing a mixture of 70–95 weight percent of styrene and 30–5 weight percent of butadiene in aqueous emulsion in the presence of a substance which promotes the solubility of the resulting resin in benzene and selected from the group consisting of mercaptans containing at least six carbon atoms, dialkyl polysulfides, and dialkyl xanthogen polysulfides, and (3) sulfur as a vulcanizing ingredient for the binder, the parts being by weight per 100 parts by weight of rubbery copolymer.

2. A composition in sheet form comprising a filler including about 10 to about 25 parts of a cellulosic flock material together with a substantial and effective amount of mineral filler, and as a binder therefor the vulcanizate resulting from the vulcanization of (1) a rubbery copolymer of a major proportion of butadiene and a minor proportion of styrene, (2) 25 to 100 parts of a hard, thermoplastic resin obtained by copolymerizing a mixture of 70–95 weight percent of styrene and 30–5 weight percent of butadiene in aqueous emulsion in the presence of a substance which promotes the solubility of the resulting resin in benzene and being an alkyl mercaptan having 6 to 18 carbon atoms, and (3) sulfur as a vulcanizing ingredient for the binder, the parts being by weight per 100 parts by weight of rubbery copolymer.

3. A composition in sheet form comprising a filler including about 10 to about 25 parts of a cellulosic flock material together with 60 to 100 parts of mineral filler, and as a binder therefor the vulcanizate resulting from the vulcanization of (1) a rubbery copolymer of a major proportion of butadiene and a minor proportion of styrene, (2) 25 to 100 parts of a hard, thermoplastic resin obtained by copolymerizing a mixture of 70–95 weight percent of styrene and 30–5 weight percent of butadiene in aqueous emulsion in the presence of a substance which promotes the solubility of the resulting resin in benzene and selected from the group consisting of mercaptans containing at least six carbon atoms, dialkyl polysulfides, and dialkyl xanthogen polysulfides, and (3) sulfur as a vulcanizing ingredient for the binder, the parts being by weight per 100 parts by weight of rubbery copolymer.

4. A shoe sole comprising a filler including about 10 to about 25 parts of a cellulosic flock material together with a substantial and effective amount of mineral filler, and as a binder therefor the vulcanizate resulting from the vulcanization of (1) a rubbery copolymer of a major proportion of butadiene and a minor proportion of styrene, (2) 25 to 100 parts of a hard, thermoplastic resin obtained by copolymerizing a mixture of 70–95 weight percent of styrene and 30–5 weight percent of butadiene in aqueous emulsion in the presence of a substance which promotes the solubility of the resulting resin in benzene and selected from the group consisting of mercaptans containing at least six carbon atoms, dialkyl polysulfides, and dialkyl xanthogen polysulfides, and (3) sulfur as a vulcanizing ingredient for the binder, the parts being by weight per 100 parts by weight of rubbery copolymer.

5. A shoe sole comprising a filler including about 10 to about 25 parts of a cellulosic flock material together with a substantial and effective amount of mineral filler, and as a binder therefor the vulcanizate resulting from the vulcanization of (1) a rubbery copolymer of a major proportion of butadiene and a minor proportion of styrene, (2) 25 to 100 parts of a hard, thermoplastic resin obtained by copolymerizing a mixture of 70–95 weight percent of styrene and 30–5 weight percent of butadiene in aqueous emulsion in the presence of a substance which promotes the solubility of the resulting resin in benzene and being an alkyl mercaptan having 6 to 18 carbon atoms, and (3) sulfur as a vulcanizing ingredient for the binder, the parts being by weight per 100 parts by weight of rubbery copolymer.

6. A shoe sole comprising a filler including about 10 to about 25 parts of a cellulosic flock material together with 60 to 100 parts of mineral filler, and as a binder therefor the vulcanizate resulting from the vulcanization of (1) a rubbery copolymer of a major proportion of butadiene and a minor proportion of styrene, (2) 25 to 100 parts of a hard, thermoplastic resin obtained by copolymerizing a mixture of 70–95 weight percent of styrene and 30–5 weight percent of butadiene in aqueous emulsion in the presence of a substance which promotes the solubility of the resulting resin in benzene and selected from the group consisting of mercaptans containing at least six carbon atoms, dialkyl polysulfides, and dialkyl xanthogen polysulfides, and (3) sulfur as a vulcanizing ingredient for the binder, the parts being by weight per 100 parts by weight of rubbery copolymer.

7. A shoe sole composition in sheet form comprising a filler including 10 to 25 parts of a cellulosic flock material, together with a substantial and effective amount of mineral filler and, as a binder therefor the vulcanizate resulting from the vulcanization of a mixture of (1) a rubbery copolymer resulting from the polymerization of a mixture containing 60 to 85 weight percent of butadiene-1,3 and 40 to 15 weight percent of styrene, (2) 25 to 100 parts of a hard, thermoplastic resin obtained by copolymerizing a mixture of 70–95 weight percent of styrene and 30–5 weight percent of butadiene in aqueous emulsion in the presence of a substance which promotes the solubility of the resulting resin in benzene and being an alkyl mercaptan having 6 to 18 carbon atoms, (3) 2 to 3 parts of sulfur, (4) 1 to 2 parts of an organic accelerator, (5) 3 to 5 parts of zinc oxide, (6) 0.5 to 1 part of stearic acid, and (7) 5 to 20 parts of a softener, the parts being by weight and per 100 parts by weight of rubbery copolymer.

GEORGE H. GATES.

(References on following page)

References Cited in the file of this patent

UNITED STATES PATENTS

| Number | Name | Date |
|---|---|---|
| 2,029,371 | Hickler | Feb. 4, 1936 |
| 2,039,529 | Guinzburg | May 5, 1936 |
| 2,393,208 | Waterman et al. | Jan. 15, 1946 |
| 2,414,803 | D'Alelio | Jan. 28, 1947 |
| 2,419,202 | D'Alelio | Apr. 22, 1947 |
| 2,452,999 | Daly | Nov. 2, 1948 |
| 2,477,316 | Sparks et al. | July 26, 1949 |
| 2,541,748 | Daly | Feb. 13, 1951 |

FOREIGN PATENTS

| Number | Country | Date |
|---|---|---|
| 345,939 | Great Britain | Mar. 16, 1931 |

OTHER REFERENCES

Rubber Age, November 1947, page 200.
Modern Plastics, February 1947, pp. 100–102.
Vanderbilt 1942, Rubber Handbook, pp. 140–149, published 1942 by R. T. Vanderbilt Co., N. Y.
India Rubber World, January 1945, page 422.
India Rubber World, February 1945, p. 590.